United States Patent
Jiang et al.

(10) Patent No.: US 11,456,818 B2
(45) Date of Patent: Sep. 27, 2022

(54) SENSITIVITY OF BLUETOOTH RECEIVER BY INTRODUCING INTERLEAVER

(71) Applicant: Fudan University, Shanghai (CN)

(72) Inventors: Yi Jiang, Shanghai (CN); Jie Yang, Shanghai (CN); Qinghe Du, Shanghai (CN); Rui Wang, Shanghai (CN); Wei Zhang, Shanghai (CN); Fengjie Li, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 0 days.

(21) Appl. No.: 17/157,170

(22) Filed: Jan. 25, 2021

(65) Prior Publication Data
US 2022/0239404 A1    Jul. 28, 2022

(51) Int. Cl.
*H04L 1/00* (2006.01)
*H04W 4/80* (2018.01)

(52) U.S. Cl.
CPC ............ *H04L 1/005* (2013.01); *H04W 4/80* (2018.02)

(58) Field of Classification Search
CPC ................................ H04L 1/005; H04W 4/80
USPC ........................................................ 455/41.2
See application file for complete search history.

(56) References Cited

U.S. PATENT DOCUMENTS

| | | | | |
|---|---|---|---|---|
| 8,111,790 B2* | 2/2012 | Farrokhi | ............... | H04B 17/345 375/346 |
| 2002/0168033 A1* | 11/2002 | Suzuki | ................ | H03M 13/658 375/341 |
| 2008/0176595 A1* | 7/2008 | Karaoguz | .............. | H04W 28/18 455/552.1 |
| 2012/0102378 A1* | 4/2012 | Matsumoto | ....... | H03M 13/2957 714/752 |
| 2012/0219089 A1* | 8/2012 | Murakami | ............ | H04L 25/067 375/296 |

* cited by examiner

*Primary Examiner* — David Bilodeau
(74) *Attorney, Agent, or Firm* — Hemisphere Law, PLLC; Zhigang Ma

(57) ABSTRACT

The invention belongs to the field of low-power consumption Bluetooth technology in wireless communication, in particular to a method for improving the sensitivity of the receiver in a low-power consumption Bluetooth system. The method of the invention is to introduce a deinterleaver between the symbol pattern mapper and GFSK modulator of the transmitting terminal under the low-power consumption Bluetooth coding mode, which is used to perform additional processing on the bitstream data and then perform modulation; then, due to the introduction of interleaving, Turbo iterative processing of demodulation and decoding can be performed at the receiving terminal; the receiving terminal comprises a Turbo iterative demodulator and decoder, which is used to model the low-power consumption Bluetooth GFSK modulator and convolutional coder into finite state machines, and then combine the deinterleaver to use the BCJR algorithm for iterative demodulation and decoding.

5 Claims, 3 Drawing Sheets

SENSITIVITY OF BLUETOOTH RECEIVER BY INTRODUCING INTERLEAVER

FIELD OF THE INVENTION

The invention belongs to the field of low-power consumption Bluetooth technology in wireless communication, in particular to a method for improving the sensitivity of the receiver.

BACKGROUND OF THE INVENTION

Low-power consumption Bluetooth technology is one of the representative technologies of the Internet of Things. It is widely used in low-cost, low-power consumption computing devices and short-distance wireless communication scenarios with low data rate and low duty cycle. With the development of the Internet of Things, in the 2016 Bluetooth Protocol Version 5.0 [1], the low-power consumption Bluetooth added a new physical coding layer and two coding schemes, S=2 and S=8, with the corresponding information transmission rates of 500 kb/s and 125 kb/s, respectively. The physical coding layer enhances the stability of Bluetooth signal transmission, and the transmission distance of low-power consumption Bluetooth signal can be increased by up to 4 times without increasing the transmission power, which greatly expands the application fields and development prospects of low-power consumption Bluetooth in the Internet of Things.

For the potential application of low-power consumption Bluetooth technology in the Internet of Things for Industry, the invention modifies the link layer of low-power consumption Bluetooth Protocol to significantly improve the receiving sensitivity and link reliability. For the S=2 and S=8 physical coding layers of low-power consumption Bluetooth, the receiver uses iterative algorithm and BCJR algorithm [2] to greatly improve the receiving sensitivity.

SUMMARY OF THE INVENTION

The purpose of the invention is to provide a method that can significantly improve the sensitivity of the receiver in a low-power consumption Bluetooth system, so as to further expand its application scenarios in the Internet of Things.

The method provided by the invention that can significantly improve the sensitivity of the receiver in a low-power consumption Bluetooth system is to introduce an interleaver between the symbol pattern mapper and GFSK modulator of the transmitting terminal under the low-power consumption Bluetooth S=2 and S=8 coding modes, which is used to perform additional processing on the bitstream data. On this basis, the receiving terminal can perform Turbo iterative processing of demodulation and decoding, so as to improve the sensitivity of the receiving terminal and the reliability of the link;

In the invention, the receiving terminal comprises a Turbo iterative demodulator and decoder, the purpose of which is to model the low-power consumption Bluetooth GFSK modulator and convolutional coder into finite state machines, and then combine the interleaver to use the BCJR algorithm [2] for iterative demodulation and decoding, so as to significantly reduce the bit error rate and improve the sensitivity of the receiver.

In the invention, the Turbo iterative demodulation and decoding process uses BCJR algorithm [2].

The function modules of the entire physical layer link is shown in FIG. 1. The introduction of interleaver enables the iterative processing of the receiver to significantly improve the sensitivity of the receiver, which involves the iterative demodulation and decoding of BCJR algorithm [2]. At the transmitting terminal, the interleaver introduced in the invention can, but is not limited to, use S-random interleaver [3]. An embodiment of S-random interleaver is shown in FIG. 3. The S-random interleaver randomly scrambles the data that is not randomly scrambled, and the adjacent interval of the data before the scrambled data is greater than or equal to $\sqrt{(S/2)}$. As shown the 18 bits in FIG. 3, the spacing distance between adjacent bits before interleaving is greater than or equal to 3 after interleaving.

Due to the introduction of an interleaver between the symbol pattern mapper and GFSK modulator of the transmitting terminal, the forward error control coder (FEC) has four coding options: in addition to the existing S=2 and S=8 coding modes, there are more interleaved S=2 coding mode and interleaved S=8 coding mode. In order to be backward compatible, two new coding options can be introduced into the Coding Indicator (CI), as shown in Table 1. This is to add two new options to the coding indicator field, which can be selected in the preamble sequence of the transmitting terminal. The specific data packet structure of the transmitting terminal is shown in FIG. 2. Through the indicator, it is convenient for the receiving terminal to select the demodulation and decoding methods after receiving. See FIG. 1 for the processing flow diagram of the bitstream transmitting-receiving of the new coding modes.

The invention also considers the actual conditions of 5G in different application scenarios, which can significantly reduce the bit error rate and improve the sensitivity of the receiver. The receiver of the invention is established by a finite state machine based on GFSK signal modulation and convolutional coder, and then demodulates and decodes with BCJR algorithm based on state transition. In view of the S=2 and S=8 coding modes in Bluetooth Protocol, the invention also models the coding structure as a grid state diagram for decoding, and the established phase transition diagram is shown in FIG. 4. The specific steps are as follows:

Step 1, the finite state machine modeling of GFSK modulator and convolutional coder.

The output signal of GFSK modulator, its phase is:

$$\phi(t; I) = 2\pi h \sum_{k=-\infty}^{n} I_k q(t-kT), (n-1)T \le t \le nT \quad (1)$$

From the GFSK signal model, there are:

$$\phi(t; I) = \frac{\pi}{2}\sum_{k=-\infty}^{n-2} I_k + \pi \sum_{k=n-1}^{n} I_k q(t-kT) \quad (1)$$

$$q(t) = \int_0^t g(\tau)d\tau \quad (3)$$

Of which, $$g(t) = \frac{1}{2T}\left[Q\left(2\pi BT \frac{t-\frac{T}{2}}{\tau\sqrt{\ln 2}}\right) - Q\left(2\pi BT \frac{t+\frac{T}{2}}{\tau\sqrt{\ln 2}}\right)\right],$$

Q( ) is the Gaussian Q function, $I_k \in \{\pm 1\}$ is the input random bitstream, h is the modulation index of GFSK; BT is the time-bandwidth product, and the effective duration of the pulse shaping function q(t) is 2T;

So there are:

When t<0, q(t)=0; when t≥2T, q(t)=½; when t<0 and t≥2T, g(t)=0;

$$\phi(t;I) = \frac{\pi}{2}\sum_{k=-\infty}^{n-2} I_k + \pi \sum_{k=n-1}^{n} I_k q(t-kT) = \quad (4)$$

$$\varphi_n + \pi I_{n-1} q(t-(n-1)T) + \pi I_n q(t-nT)$$

When the receiving terminal samples at integral multiple time of the symbol duration, the above formula can be rewritten as follows:

$$\phi(t;I) = \frac{\pi}{2}\sum_{k=-\infty}^{n-1} I_k + \pi I_n q(t-nT) \quad (5)$$

In the above formula, $I_n$ is determined by the output of the convolutional coder, so we can model the phase modulation process of the above formula into a finite state machine, as shown in FIG. 4, the phase value transition is shown in Table 2.

Similarly, we can also establish a finite state grid diagram for the coding of the coder, which is a standard process and will not be repeated.

Step 2, according to the finite state machine modeled by the receiving signal in Step 1, we can use a grid diagram to represent its structure, and also use the BCJR algorithm to demodulate and decode the GFSK signal.

The specific process is as follows:

S=2 Coding Mode:

(1) Through the state transition diagram of the modulation phase, the observed data sampled from the receiving terminal and the initial log-likelihood ratio of each coding bit are used as prior information, and the BCJR algorithm is used to calculate the posterior probability and log-likelihood ratio of each coding bit;

The likelihood ratio information obtained in the Process (1) is regarded as the probability of the prior information and the original information bits. By modeling the grid diagram of the coding structure, the BCJR algorithm is also used to update the posterior probability and log-likelihood ratio information of each coding bit. Meanwhile, when calculating the log-likelihood ratio of each coding bit, the BCJR algorithm is also used to calculate the log-likelihood ratio of the original bit information, and then make a hard decision to obtain the original information bit {0, 1};

(2) The coding log-likelihood ratio information obtained in the Process (2) is input as the prior information of (1) for iterative demodulation and decoding.

S=8 Coding Mode:

The LLR of each bit obtained in (1) must be demapped first. After the LLR is demapped, the LLR of each coding bit is obtained through the above Step (2), and the LLR of each information bit is also calculated, and then a hard decision is made to decode. The calculated LLR of each coding bit is mapped to obtain the LLR after mapping, and then perform Step (1) to complete the iteration.

The simulation results show that, by introducing an interleaver at the transmitting terminal, the receiving terminal can use iterative demodulation and decoding to significantly improve the receiving sensitivity of the receiver. Compared with the transmitting terminal that does not use the interleaver and the receiving terminal adopts the Viterbi optimal joint demodulation and decoding algorithms, the S=2 decoding scheme proposed in the invention can improve the performance gain of about 3-5 dB at high signal-noise ratio, as shown in FIG. 6, the S=8 decoding scheme can further improve the performance gain of about 3-6 dB compared with Viterbi.

BRIEF DESCRIPTION OF THE FIGURES

Table 1 is the scheme of the introduced coding indicator.

Table 2 is the phase transition value of modeling GFSK modulation as a finite state machine.

DESCRIPTION OF THE INVENTION

The invention will be described by a specific embodiment below.

Figure 1:
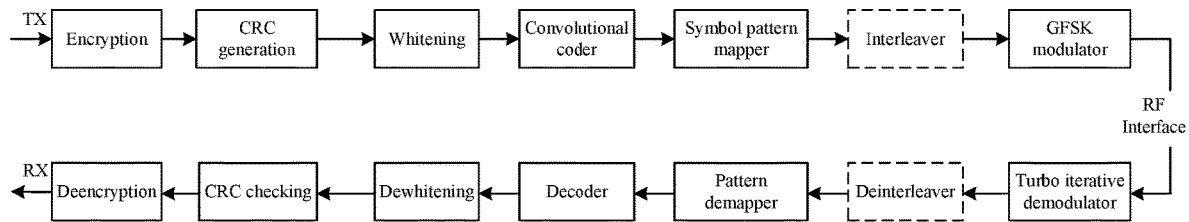
FIG. 1 is the function modules of the transmitting terminal and receiving terminal in Bluetooth protocol link layer.
Figure 2:
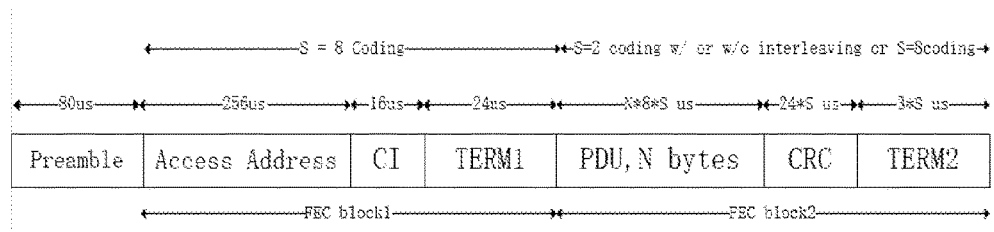
FIG. 2 is the link layer packet structure.
Figure 3:
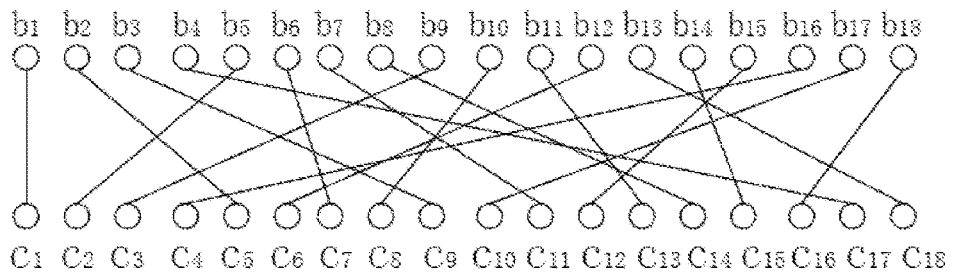
FIG. 3 is an embodiment of an 18-random interleaver.

As an embodiment, the invention simulates the complete process of Bluetooth GFSK signal coding-interweaving-modulation-demodulation-deinterleaving-decoding by computer, as shown in FIG. 1. During the simulation process, 512 bit bit data is randomly generated. After passing through the coder and interleaver, the data is added into the preamble to form a data packet and sent out. According to the coding indicator field in Table 1 as shown in FIG. 2, such field is added to the data packet at the transmitting terminal. When receiving the field, the receiving terminal demodulates, decodes and restores the original data with the corresponding scheme. The modulation index of GFSK is 0.5, sample the coding mode stipulated by the low-power consumption Bluetooth Protocol, and simulate under the coding scheme of S=2 and S=8.

Figure 4:
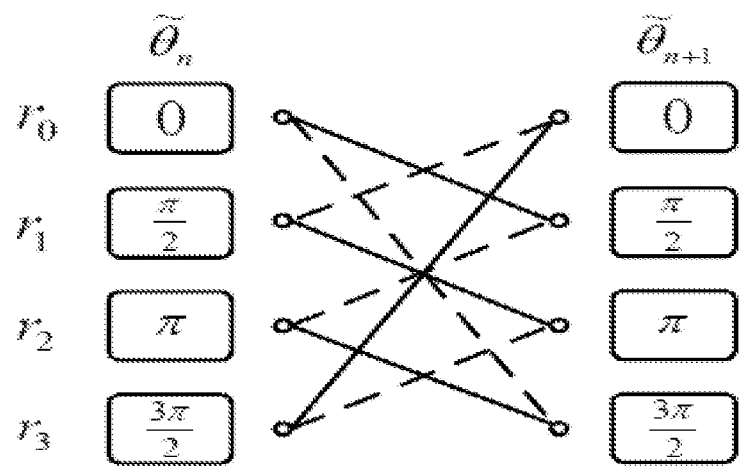
FIG. 4 is the phase transition diagram of modeling GFSK modulation as a finite state machine.
Figure 5:
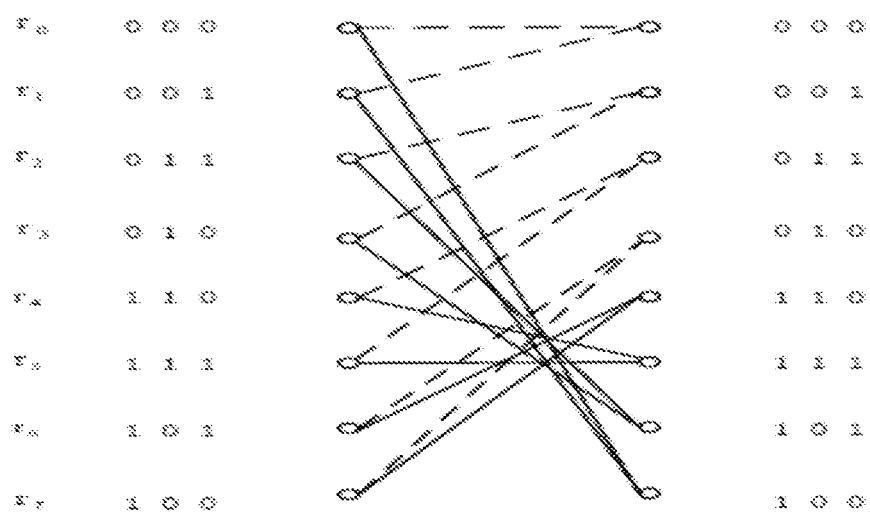
FIG. 5 is a grid diagram modeled by the coding structure.

At the receiving terminal, it needs to demodulate and then decode. In the demodulation part, according to the transmitted GFSK and its own modulation characteristics, the four phase transitions are modeled. As shown in FIG. 4, the soft information obtained by demodulation is input to the decoder, and the grid transition diagram established by the decoder is shown in FIG. 5. The number of iterations is set to 2 and 2,000 Monte Carlo experiments are performed.

Figure 6:
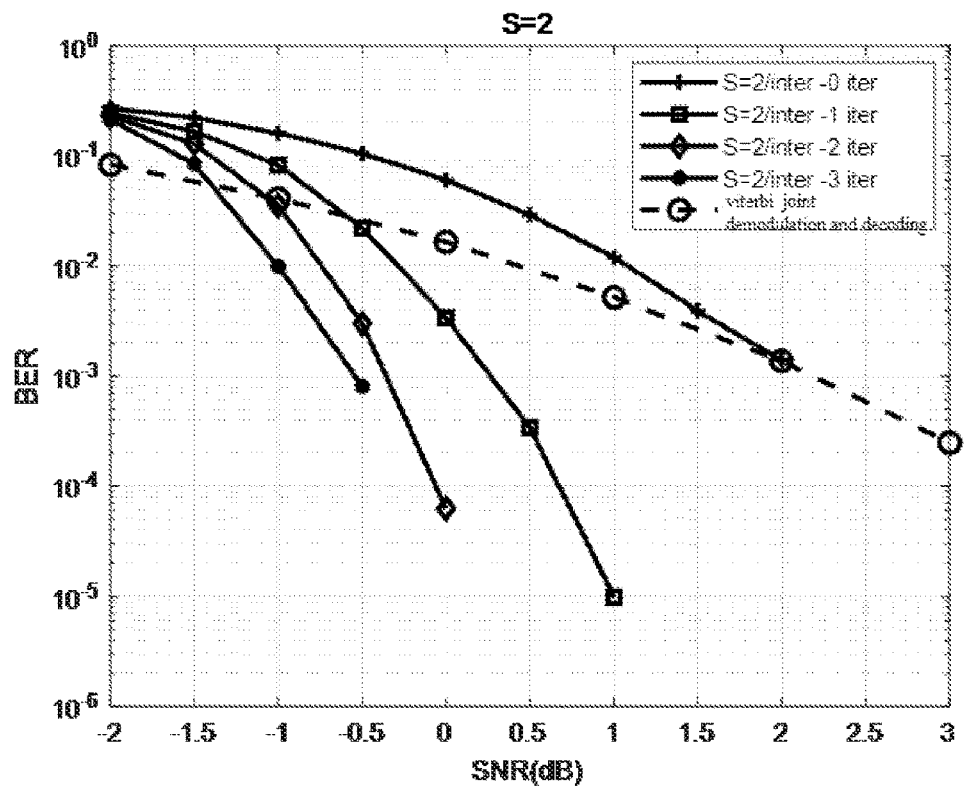
FIG. 6 is the comparison between the bit error rate performance of the interleaver introduced by the invention under the S=2 coding mode and the optimal Viterbi algorithm.

The final bit error rate performance and comparison are shown in FIG. 6, where the x-axis is the simulated signal-noise ratio, and the y-axis is the bit error rate after decoding at the receiving terminal.

Figure 7:
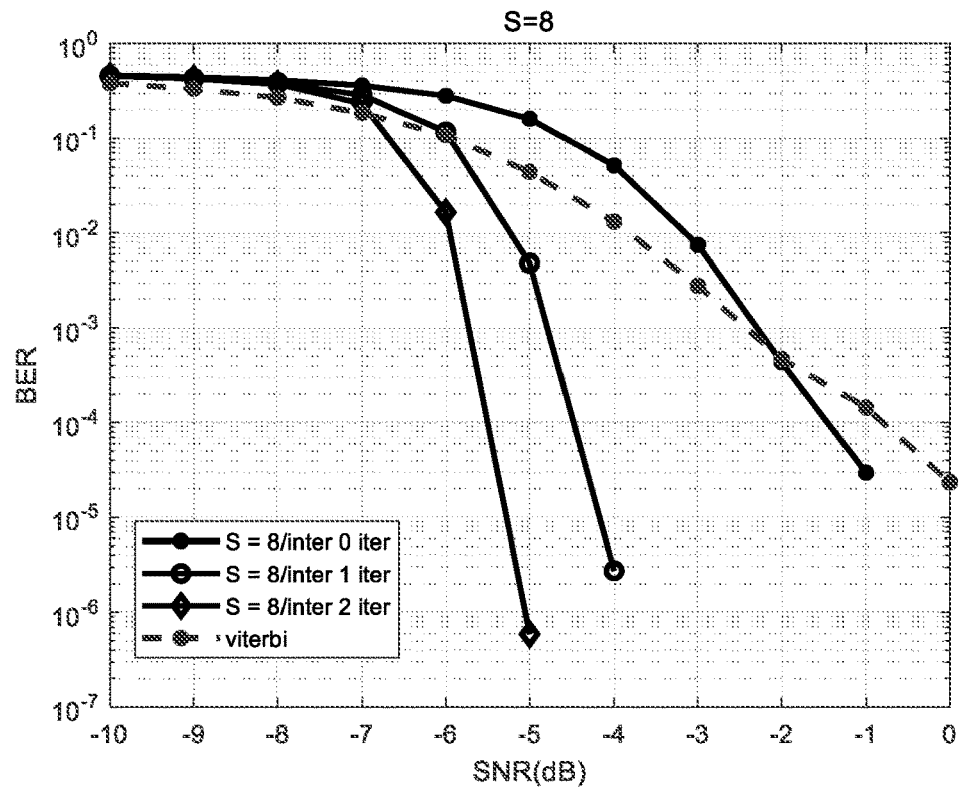
FIG. 7 is the comparison between the bit error rate performance of the interleaver introduced by the invention under the S=8 coding mode and the optimal Viterbi algorithm.

The solid mark curves in FIGS. 6 and 7 correspond to the simulation curves of the algorithm of the invention. It can be seen that the introduction of the deinterleaver proposed by the invention can significantly improve the receiving performance of the receiving terminal.

TABLE 1

Coding Indicator

| CI Field | Meaning |
|---|---|
| 00b | FEC Block 2 coded using S = 8 |
| 01b | FEC Block 2 coded using S = 2 |
| 10b | FEC Block 2 coded using S = 2 with interleaving |
| 11b | FEC Block 2 coded using S = 8 with interleaving |

TABLE 2

Phase State Transition Table of GFSK

| Last Moment State (Register State) | Input $I_n$ | Next Moment State (Register State) | Output of State Transitio $e^{j\phi(t;I)} = \phi_n + \frac{\pi}{4}I_n$ |
|---|---|---|---|
| 0 | −1 | $\frac{3\pi}{2}$ | $e^{-j\frac{\pi}{4}}$ |
| 0 | 1 | $\frac{\pi}{2}$ | $e^{j\frac{\pi}{4}}$ |
| $\frac{\pi}{2}$ | −1 | 0 | $e^{j\left(\frac{\pi}{2}-\frac{\pi}{4}\right)}$ |
| $\frac{\pi}{2}$ | 1 | $\pi$ | $e^{j\left(\frac{\pi}{2}+\frac{\pi}{4}\right)}$ |
| $\pi$ | −1 | $\frac{\pi}{2}$ | $e^{j\left(\pi-\frac{\pi}{4}\right)}$ |
| $\pi$ | 1 | $\frac{3\pi}{2}$ | $e^{j\left(\pi+\frac{\pi}{4}\right)}$ |
| $\frac{3\pi}{2}$ | −1 | $\pi$ | $e^{j\left(\frac{3\pi}{2}-\frac{\pi}{4}\right)}$ |
| $\frac{3\pi}{2}$ | 1 | 0 | $e^{j\left(\frac{3\pi}{2}+\frac{\pi}{4}\right)}$ |

REFERENCES

[1] Specification of the Bluetooth System, Volume 6, Part B Link Layer Specification, https://www.bluetooth.org/en-us/specification/adopted-specifications.
[2] R. Koetter, A. C. Singer and M. Tuchler, "Turbo equalization," in *IEEE Signal Processing Magazine*, vol. 21, no. 1, pp. 67-80, January 2004, doi: 10.1109/MSP.2004.1267050.
[3] C. Heegard and S. B. Wicker, Turbo coding. 1998.

The invention claimed is:

1. A method for improving a sensitivity of a receiving terminal in a low-power consumption Bluetooth system, which is characterized in that, it introduces an interleaver between a symbol pattern mapper and a gauss frequency shift keying (GFSK) modulator of a transmitting terminal under low-power consumption Bluetooth S=2 and S=8 coding modes, which is used to perform additional processing on bitstream data; and then perform a Turbo iterative processing of demodulation and decoding at the receiving terminal, so as to improve the sensitivity of the receiving terminal and the reliability of a link of the receiving terminal; the receiving terminal comprises a Turbo iterative demodulator and a decoder, which is used to model a low-power consumption Bluetooth GFSK modulator and a convolutional coder into finite a state machine, and then combine the interleaver to use a Bahl-Cocke-Jelinek-Raviv (BCJR) algorithm for iterative demodulation and decoding.

2. The method as described in claim 1, which is characterized in that, the interleaver is an S-random interleaver, the S-random interleaver randomly scrambles S data that are not randomly scrambled, and a spacing distance between adjacent bits before interleaving is greater than or equal to √(S/2) after interleaving.

3. The method as described in claim 2, which is characterized in that, due to the introduction of a interleaver between the symbol pattern mapper and the GFSK modulator of the transmitting terminal, a forward error control coder (FEC) has four coding options: original S=2 and S=8 coding modes, as well as interleaved S=2 and S=8 coding modes; in order to be backward compatible, two new coding options are introduced into the coding indicator, as shown in Table 1 below:

TABLE 1

Coding Indicator

| CI Field | Meaning |
|---|---|
| 00b | FEC Block 2 coded using S = 8 |
| 01b | FEC Block 2 coded using S = 2 |
| 10b | FEC Block 2 coded using S = 2 with interleaving |
| 11b | FEC Block 2 coded using S = 8 with interleaving. |

4. The method as described in claim 3, which is characterized in that, the specific operation steps are as follows:

Step 1, modeling the finite state machine of the GFSK modulator and the convolutional coder:

a phase of an output signal of the GFSK modulator is:

$$\phi(t; I) = 2\pi h \sum_{k=-\infty}^{n} I_k q(t-kT), \ (n-1)T \le t \le nT \quad (1)$$

from a GFSK signal model, there are:

$$\phi(t; I) = \frac{\pi}{2} \sum_{k=-\infty}^{n-2} I_k + \pi \sum_{k=n-1}^{n} I_k q(t-kT) \quad (1)$$

$$q(t) = \int_0^t g(\tau) d\tau \quad (3)$$

of which, $$g(t) = \frac{1}{2T}\left[Q\left(2\pi BT \frac{t-\frac{T}{2}}{T\sqrt{\ln 2}}\right) - Q\left(2\pi BT \frac{t+\frac{T}{2}}{T\sqrt{\ln 2}}\right)\right],$$

Q( ) is a Gaussian Q function, $I_k \in \{\pm 1\}$ is an input random bitstream, h is a modulation index of GFSK; BT is a time-bandwidth product, and an effective duration of a pulse shaping function q(t) is 2T;

so there are:
when t≤0, q(t)=0; when t≥2T, q(t)=½; when t<0 and t≥2T, g(t)=0;

$$\phi(t; I) = \frac{\pi}{2} \sum_{k=-\infty}^{n-2} I_k + \pi \sum_{k=n-1}^{n} I_k q(t - kT) = \quad (4)$$

$$\varphi_n + \pi I_{n-1} q(t - (n-1)T) + \pi I_n q(t - nT)$$

when the receiving terminal samples at integral multiple time of a symbol duration, the above formula is rewritten as follows:

$$\phi(t; I) = \frac{\pi}{2} \sum_{k=-\infty}^{n-1} I_k + \pi I_n q(t - nT) \quad (5)$$

in the above formula, $I_n$ is determined by an output of the convolutional coder, so we can model a phase modulation process of the above formula into the finite state machine;

similarly, we can also establish a finite state grid diagram for the coding of the convolutional coder;

Step 2, according to the finite state machine modeled by the receiving signal in Step 1, we can use a grid diagram to represent its structure, and also use the BCJR algorithm to demodulate and decode the GFSK signal; the specific process is as follows:

S=2 Coding Mode:

(1) through a state transition diagram of a modulation phase in the finite state machine, observed data sampled from the receiving terminal and an initial log-likelihood ratio (LLR) of each coding bit are used as a prior information, and the BCJR algorithm is used to calculate a posterior probability and the log-likelihood ratio of each coding bit;

(2) the likelihood ratio information obtained in the Process (1) is regarded as the probability of the prior information and the original information bits; by modeling the grid diagram of the coding structure, the BCJR algorithm is also used to update the posterior probability and log-likelihood ratio information of each coding bit; meanwhile, when calculating the log-likelihood ratio of each coding bit, the BCJR algorithm is also used to calculate the log-likelihood ratio of the original bit information, and then make a hard decision to obtain the original information bit {0, 1};

(3) the coding log-likelihood ratio information obtained in the Process (2) is input as the prior information of (1) for iterative demodulation and decoding;

S=8 Coding Mode:

the LLR of each bit obtained in (1) must be demapped first; after the LLR is demapped, the LLR of each coding bit is obtained through the above Step (2), and the LLR of each information bit is also calculated, and then a hard decision is made to decode; the calculated LLR of each coding bit is mapped to obtain the LLR after mapping, and then perform Step (1) to complete an iteration.

5. The method as described in claim 4, which is characterized in that, in the finite state machine modeled in Step (1), phase state value transition is shown in Table 2:

TABLE 2

Phase State Transition Table of GFSK

| Last Moment State (Register State) | Input $I_n$ | Next Moment State (Register State) | Output of State Transition $e^{j\phi(t;I)} = \phi_n + \frac{\pi}{4}I_n$ |
|---|---|---|---|
| 0 | −1 | $\frac{3\pi}{2}$ | $e^{-j\frac{\pi}{4}}$ |
| 0 | 1 | $\frac{\pi}{2}$ | $e^{j\frac{\pi}{4}}$ |
| $\frac{\pi}{2}$ | −1 | 0 | $e^{j(\frac{\pi}{2}-\frac{\pi}{4})}$ |
| $\frac{\pi}{2}$ | 1 | $\pi$ | $e^{j(\frac{\pi}{2}+\frac{\pi}{4})}$ |
| $\pi$ | −1 | $\frac{\pi}{2}$ | $e^{j(\pi-\frac{\pi}{4})}$ |
| $\pi$ | 1 | $\frac{3\pi}{2}$ | $e^{j(\pi+\frac{\pi}{4})}$ |
| $\frac{3\pi}{2}$ | −1 | $\pi$ | $e^{j(\frac{3\pi}{2}-\frac{\pi}{4})}$ |
| $\frac{3\pi}{2}$ | 1 | 0 | $e^{j(\frac{3\pi}{2}+\frac{\pi}{4})}$ |

* * * * *